(12) United States Patent
Ryde et al.

(10) Patent No.: US 6,181,739 B1
(45) Date of Patent: Jan. 30, 2001

(54) SIGNAL-TO-NOISE RATIO DETERMINATION USING DIGITAL SIGNAL PROCESSING

(75) Inventors: Omar Ryde, Stockholm; Olof Tomas Backström, Ekerö; Lars Peter Wahlström, Bromma, all of (SE)

(73) Assignee: Telefonaktiebolaget LM Ericsson (publ), Stockholm (SE)

( * ) Notice: Under 35 U.S.C. 154(b), the term of this patent shall be extended for 0 days.

(21) Appl. No.: 08/561,848

(22) Filed: Nov. 22, 1995

(51) Int. Cl.⁷ ............................................ H04B 17/00
(52) U.S. Cl. ................ 375/227; 455/226.2; 455/226.3
(58) Field of Search ................................. 375/227, 285, 375/346, 350, 224; 455/226.3, 226.1, 226.2, 296, 303, 306; 324/614

(56) References Cited

U.S. PATENT DOCUMENTS

| | | | |
|---|---|---|---|
| 4,627,103 | * 12/1986 | Fukuhara | 455/226 |
| 4,698,769 | * 10/1987 | McPherson et al. | 364/724 |
| 4,750,214 | * 6/1988 | Hort et al. | 455/214 |
| 5,295,178 | 3/1994 | Nickel et al. | 379/58 |
| 5,367,539 | * 11/1994 | Copley et al. | 375/347 |
| 5,419,331 | * 5/1995 | Parker et al. | 128/661.08 |
| 5,506,869 | * 4/1996 | Royer | 375/224 |
| 5,701,598 | * 12/1997 | Atkinson | 455/161.2 |
| 5,710,791 | * 1/1998 | Royer et al. | 375/224 |

FOREIGN PATENT DOCUMENTS

| | | |
|---|---|---|
| 589 595 | 3/1994 | (EP) . |
| 86/04762 | 8/1986 | (WO) . |

OTHER PUBLICATIONS

European Standard Search Report No. RS 96060 Date of completion of search: Jun. 3, 1996.

* cited by examiner

*Primary Examiner*—Don N. Vo
(74) *Attorney, Agent, or Firm*—Burns, Doane, Swecker & Mathis, L.L.P.

(57) ABSTRACT

Methods and systems for measuring signal noise of supervisory audio tones (SATs) in radiocommunication systems are disclosed. Exemplary embodiments involve extracting a real component from a received SAT signal, removing the SAT signal portion and examining the remainder to determine a noise component present in the SAT. The noise component can be compared with a signal strength measurement to obtain a signal-to-noise ratio.

11 Claims, 3 Drawing Sheets

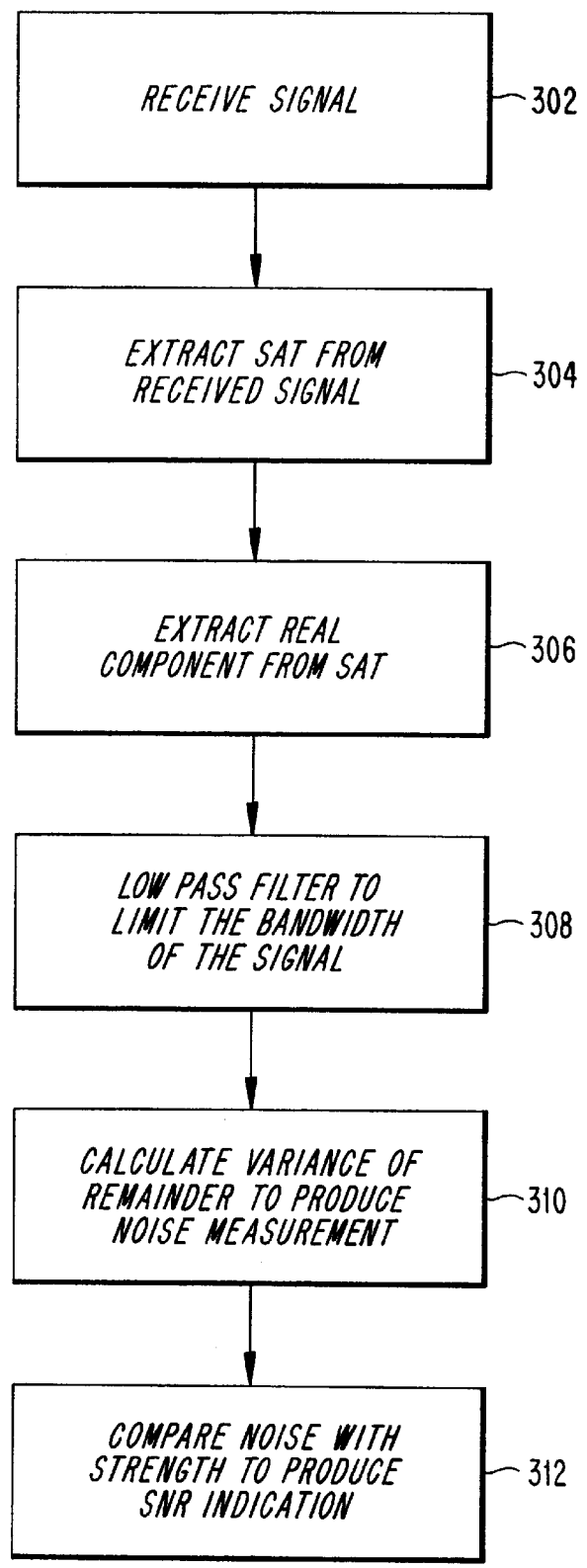

SIGNAL-TO-NOISE RATIO DETERMINATION USING DIGITAL SIGNAL PROCESSING

RELATED APPLICATIONS

The following patent applications are related to the present application: U.S. patent application Ser. No. 08/561,055, entitled "Supervisory Audio Tone Detection Using Digital Signal Processing" to Omar Ryde et al., now U.S. Pat. No. 5,953,660 and U.S. Patent application Ser. No. 08/562,085, entitled "Radio Channel Squelching Systems and Methods" to Jafar Rostamy et al. now U.S. Pat. No. 5,970,399, both of which were filed on the same date as the present application. The disclosures of these related applications are expressly incorporated here by reference.

BACKGROUND

The present invention is directed generally to radiocommunication systems and, more particularly, to techniques for determining a noise of a radio channel in a radiocommunication system, and hence a signal-to-noise ratio (SNR) of such a radio channel.

In cellular mobile radio systems it is desirable that a mobile station with an established connection on a radio channel should be able to monitor the quality of the established connection when moving from one cell served by one base station to another cell served by another base station. The process by which a mobile station maintains an established connection when moving between cells in a cellular radio system is generally called handoff. It is also highly desirous that a mobile station with an established connection on a radio channel be able to maintain the connection when moving within the same cell, even if the radio channel being used is subject to increased interference. If the quality of the established connection falls below specified parameters it may be further desirable to temporarily mute, or automatically disconnect the connection in the event that handoff or other signal processing fails to improve the quality of the connection.

In general, radiocommunication is only possible when the desired information-carrying radio signals have sufficient signal strength at the receiver and are sufficiently strong in relation to noise and interfering radio signals at the receiver. The noise present in a radio channel, and consequently the signal-to-noise ratio (SNR), depends on the particular features of the system, e.g., the kind of modulation and receiver used. In order to determine if an established connection should continue on a selected radio channel between a mobile station and a base station, handoff and disconnect processes perform various measurements on radio signals at the intended base and/or mobile stations.

The first cellular mobile radio systems in public use were analog systems used to convey speech or other analog information. These systems comprised multiple radio channels for transmitting analog information between base and mobile stations by transmitting analog-modulated radio signals. In general, the signal measurements made during the handoff and disconnect processes in such systems were performed by the base stations. One such system is known as the Nordic Mobile Telephone system NMT 450. Another known analog cellular mobile radio system, of particular interest as background to the present invention, is the Advanced Mobile Phone Service (AMPS) mobile radio system utilized in the U.S.A.

Recently, digital cellular mobile radio systems for public use have been designed. Digital cellular mobile radio systems provide digital radio channels for transmitting digital or digitized analog information between base and mobile stations using digitally modulated radio signals. Digital cellular mobile radio systems may offer substantial advantages, e.g. greater system capacity per unit bandwidth, over analog cellular mobile radio systems. To achieve these advantages there are certain demands. In particular, channel supervision, handoff and disconnect processes need to be performed rapidly and be frequently carried out relative to conventional analog systems.

In contrast to the introduction of digital-only cellular mobile radio systems, like the GSM system employed in parts of Europe, in areas with existing analog cellular systems it has been proposed to introduce digital cellular mobile radio systems which are designed to cooperate with the existing analog cellular mobile radio systems. In this way large legacy customer bases will not suddenly find that their terminal equipment has become obsolete. System designers of these hybrid systems believe that the digital portion of the system can be gradually introduced and, over time, the number of digital channels can be gradually increased, while the number of analog channels is gradually decreased. In order to provide complete compatibility, such dual-mode systems should comport with both the analog and digital standards that have been adopted, for example the analog AMPS and TACS standards.

In addition to an information signal whose strength can be readily measured, a radio channel signal comprises a noise component that also can be measured and compared with a corresponding strength measurement to provide a signal-to-noise ratio (SNR) indication. Conventional analog base stations measure the channel signal strength and noise using analog hardware components and periodically supply a channel's signal-to-noise ratio indication to the network. The transmission quality of the channel can be gauged based on the signal-to-noise ratio indication.

In AMPS, a supervisory audio tone, abbreviated SAT, is transmitted on analog communication channels. A measurement of SAT signal strength is determined to monitor the presence of a channel connection. More specifically, a base station transmits a SAT to a mobile station which receives the SAT and transponds the tone back to the base station to close the loop. The reason for transmitting the SAT in AMPS is that, in an interference-limited mobile radiocommunication network, there should be some mechanism for the receiving entity (e.g., a base station), to identify the transmitting entity (e.g., a mobile station) or at least with high likelihood exclude interchange of transmitter entities without the need for continuous transmission of a transmitter identity. Thus, the base station expects to receive the same SAT that it sent out, i.e., on the same frequency. If a different SAT is received by the base station then the connection is perceived to be interfered with and may be disconnected. In order to qualify as a valid SAT, it must be received by the base station at some predetermined signal strength. Thus, conventional analog base stations measured the SAT strength using analog hardware components and supplied a SAT signal strength report to the network periodically, for example the AMPS standard specifies that SAT signal strength be reported at least every 250 ms.

Although dual-mode base stations and mobile stations continue to support analog system functions, such as SAT signal strength measurement and SNR determination, the ways in which these functions are supported are continuously being improved to reduce cost and improve quality. With the increased power of digital signal processors (DSPs), system designers are interested in implementing many signal processing techniques previously implemented using analog hardware components as DSP routines. DSP implementation has the added attraction of reducing the number of components, and hence the size, of the base stations and mobile stations.

Of course, digital signal processing also has its limitations. One design tradeoff which system designers confront when trying to implement analog signal processing techniques as DSP routines is that of speed of execution of a routine versus the amount of DSP resources, e.g., the available number of millions of instructions per second (MIPS), which are allocated to execute a given routine. Since digital signal processing is not yet sufficiently inexpensive that the number of MIPS used for each routine is insignificant, system designers are called upon to develop innovative digital signal processing techniques that reduce the number of MIPs used so that the digital signal processor can handle as many tasks as possible.

Use of DSP routines to execute tasks previously performed by analog hardware is not a straightforward proposition. Given limited DSP resources for performing a variety of tasks, designers must be able to manage receipt of converted signals, processing of such signals, extraction and/or calculation of desired information, and output processing of desired information and/or signals. However, as alluded to above, DSP resources for performance of these tasks are typically limited in terms of costs, availability and speed. Hence, digital signal processors should be utilized in an efficient manner to achieve the advantages of their use, while maintaining the required signal sampling, processing, and provision of desired information, such as a signal-to-noise ratio measurement.

SUMMARY

These and other drawbacks and limitations of conventional methods and techniques for measuring, for example, the noise and SNR in a radiocommunication system are overcome according to the present invention. Exemplary embodiments describe how such measurements may be performed using digital signal processing techniques, while minimizing the amount of computing power, e.g., MIPs, used to accomplish this task. In accordance with the invention, a quadrature (I or Q) component is extracted from a stream of signal samples and examined to determine the noise present in the signal. A known information component is removed from the signal samples leaving a remainder from which remainder a noise signal measurement can be derived.

In an exemplary embodiment of systems and methods incorporating the invention, SNR measurement is combined with SAT strength measurement to reduce the overall number of computations used to provide these measurements. For example, SAT signal samples are taken from which the real (in-phase or "I") component is extracted. The extracted real component is low-pass filtered. The variance of the filtered output is used to obtain a measure of noise. The measure of noise can be compared with a strength measurement of the SAT signal to provide a SNR indication.

BRIEF DESCRIPTION OF THE DRAWINGS

The foregoing, and other objects, features and advantages of the present invention will be more readily understood upon reading the following detailed description in conjunction with the drawings in which:

FIG. 3 is a flow diagram of an exemplary embodiment of the present invention.

DETAILED DESCRIPTION

Figure 1:
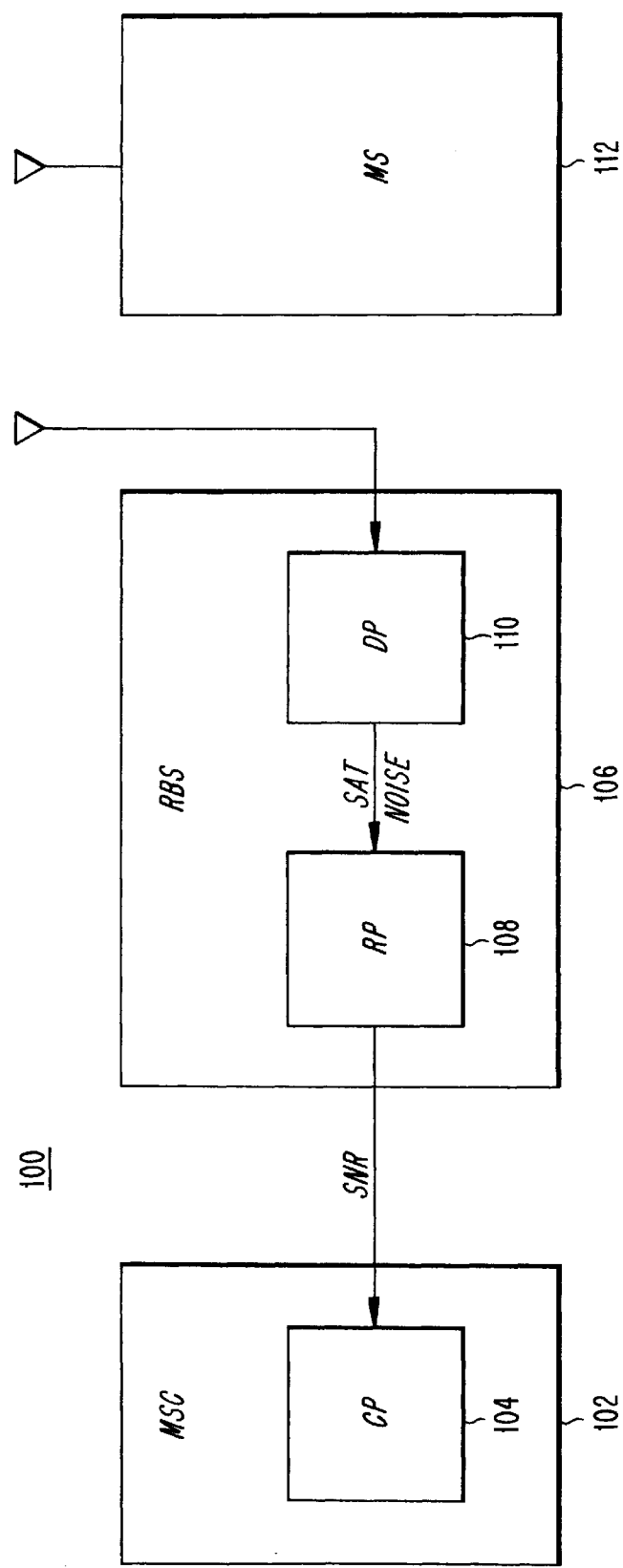
FIG. 1 is a block diagram generally illustrating SAT measurement and reporting in a radiocommunication system according to an exemplary embodiment of the present invention.

As described above, the supervisory audio tone (SAT) is used to monitor connections between base stations and mobile stations for analog radio traffic channels. To describe generally how the SAT is used, FIG. 1 illustrates exemplary functional units in a radiocommunication system 100 by way of a general block diagram. The radio base station (RBS) 106 transmits its SAT. A mobile station (MS) 112 transponds an SAT, at the same frequency which is detected in the transmission from the RBS, back to the RBS 106 during the time that it is connected to the RBS 106 via an analog traffic channel. The SAT signal strength and noise are detected and measured, in accordance with an exemplary embodiment of the invention, by a digital processor (DP) or digital signal processor (DSP) 110 in the radio base station 106. The digital signal processor 110 reports the received signal strength and noise of the SAT to another processor 108 (sometimes referred to as a regional processor (RP)) in RBS 106. The processor 108 interprets the reported SAT signal strength and noise, for example, as a signal-to-noise ratio (SNR), and can compare the SNR to a predetermined threshold. This interpretation is then forwarded to the network via a central processor (CP) 104 of mobile switching center (MSC) 102. Since many of the details of base station hardware per se are not germane to a discussion of the present invention. Applicants have omitted such details to avoid obscuring the invention. Readers interested in additional details of base stations including digital signal processors, generally, are directed to U.S. Pat. No. 5,295,178 which disclosure is incorporated herein by reference.

Systems operating in accordance with the present invention operate on the premise of extracting an anticipated signal from a received signal, filtering out the anticipated portion and examining any remaining signals to determine an amount of noise present as an indication of noise in the transmission channel. An exemplary embodiment of the invention uses SAT. SAT is continuously broadcasted along with a voice signal at a known frequency and can be readily extracted. Noise is generally ubiquitous, hence investigating any bandwidth of a SAT sample from which the SAT has been filtered out can provide a reliable indication of the amount of noise present in a channel.

Figure 2:
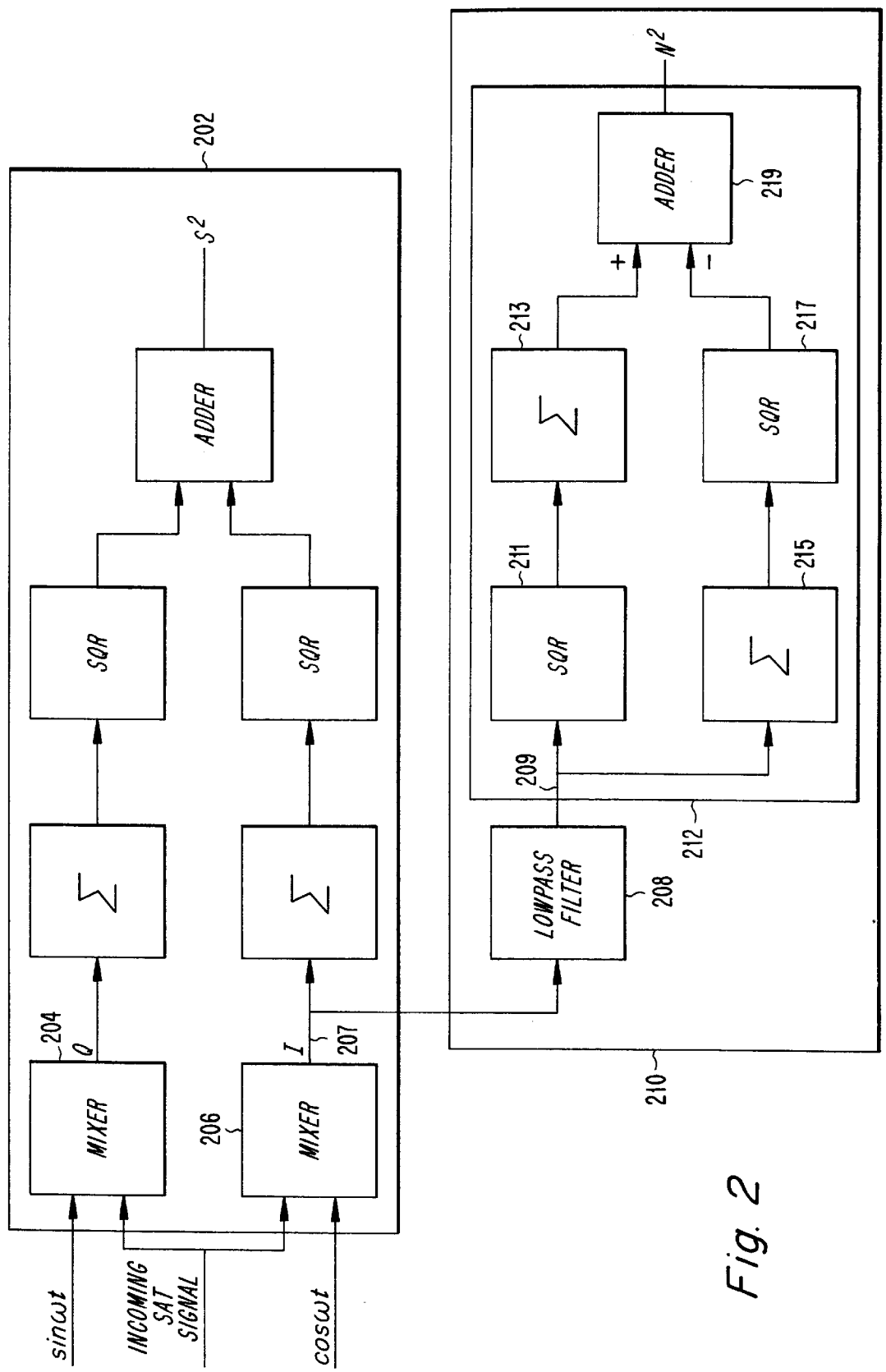
FIG. 2 is a block diagram illustrating a derivation of an imaginary component to provide an indication of SAT signal noise.

Conventionally, analog hardware was also used to measure the signal strength of the SAT in radio base stations. The SAT signal strength measurement technique applied in these conventional systems can be recreated in a digital signal processing routine by performing a digital or discrete fourier transform (DFT) on the received signal at the expected SAT frequency. DFT transformation of the received signal is illustrated in FIG. 2 at block 202. Those skilled in the art will be familiar with the way in which a digital fourier transform is performed. In FIG. 2, the SAT strength is derived in the upper portion 202 of the circuit diagram to produce a strength measurement $S^2$. A more complete description of a method and apparatus for determining the aforementioned SAT strength, including the functionality of the unnumbered blocks in FIG. 2, is disclosed in the above-incorporated U.S. patent application Ser. No. 08/561,055 entitled "Supervisory Audio Tone Detection Using Digital Signal Processing". However, the particular method and means for performing the strength measurement is not critical to the present invention which primarily involves the determination of signal noise. Of significance, however, is that the repeated step of multiplying the incoming signal samples to extract the real component is performed just once for both the SAT detection and measurement, thereby saving a large number of calculations. As will be appreciated by one skilled in the art, a signal strength measurement, by whatever means, can be combined with a noise measurement as provided by systems operating in accordance with the present invention, to produce, for example, a SNR measurement. As long as a signal and noise measurements are consistently made and compared, the corresponding SNR will provide the information indicative of the quality of the channel. Hence, the signal strength measurement can be performed by any suitable method or apparatus.

Referring back to FIG. 2, the incoming sample stream is separated into its real (in-phase), I, and imaginary (quadrature), Q, components at mixers 204 and 206, respectively. The frequency, ω, chosen for mixing at blocks 204 and 206 is that of the expected SAT returned by the mobile station. A number of different SAT frequencies may be used in a radiocommunication system to differentiate between neighboring cell transmissions. For example, three SAT frequencies, 5970, 6000 and 6030 Hz, are used in AMPS.

In accordance with an exemplary embodiment of the invention, the real (in-phase, or "I") component 207 extracted from the incoming signal and output from the mixer 206 is provided to the noise determination block 210 for calculation of a noise component of the incoming SAT signal. A low pass filter 208 within the noise determination block 210, filters the real component 207 to limit the bandwidth. In accordance with preferred embodiments, the low pass filter 208 downsamples the mixer output 207 at a rate of, for example, 1000 Hz since the noise to be measured is at a much lower frequency and allows signals having a frequency no greater than 100 Hz to pass. Those skilled in the art will appreciate that the signal could be downsampled to any desired frequency which is consistent with the constraints imposed by sampling theory. Investigating noise in the sub 100 Hz band has the further desirable effect of minimizing the DSP resources that must be dedicated to sampling and processing relatively low frequency signals, i.e., since the signal can be downsampled. The output 209 of the low pass filter 208 is then used to derive a noise measurement. In accordance with a preferred embodiment of the invention, the noise measurement is performed by calculating a variance of the filter output 209. The variance can be calculated in accordance with Equation 1.

$$\Sigma M^2 - (\Sigma M)^2 = N^2 \qquad \text{Equation 1}$$

where M is a signal sample.

Calculated as shown, the variance provides a noise measurement having a value $N^2$, which can be combined with the strength output $S^2$ from block 202, as $S^2/N^2$, to provide a signal-to-noise ratio measurement. The aforementioned U.S. application Ser. No. 08/561,055 describes in greater detail the evaluation of SAT signal strength, $S^2$, in association with block 202.

The exemplary embodiment of FIG. 2 utilizes an arrangement of arithmetic logic devices within block 212 to perform the variance calculation. Within block 212, a squaring device 211 squares each sample of the filter output 209. The squared values output by the squaring device 211 are accumulated within a summing device 213. The squaring and summing devices, 211 and 213 form the first element of Equation 1. Each sample of the filter output 209 also is provided to, and accumulated within a summing device 215. The value accumulated within the summing device 215 is squared by squaring device 217 to provide a value that corresponds to the second element of Equation 1. The output of the squaring device 217 is subtracted from the output of the summing device 213 in an adder 219 to provide the noise measurement $N^2$. Of course, the variance calculation can be performed in any of a number of ways, including processing steps in a DSP routine. An exemplary pseudocode routine is provided below.

```
for (i=0; i<SAT_FRAME_LEN;i++)
{
    y(n)    =   a_0~x(n) + a_1~x(n-1) + a_2x(n-2)
                + b_0~y(n-1) + b_1y(n-2);
    y(n-2)  =   y(n-1);
                /*a_0,a_1,a_2,b_0,b_1 are the LP filter coefficients*/
    y(n-1)  =   y(n);
    y(n-2)  =   x(n-1);
    x(n-1)  =   x(n);
}
if  (downsampling)              /*Downsampling to 1KHz*/
{   y(n)    =   y(n)*4;
    noise_sum_sar = noise_sum_sgr + pow(y(n),2);
    noise_sum_sum = noise_sum_sum + y(n)*4;
}
if  (SAT_DFT_LEN)               /*time to compute N2*/
{
    sum_noise = noise_sum_sar - pow(noise_sum_sum,2)
                                 ─────────────────────
                                      SAT_DFT_LEN
}
/*  SNR = 10.Log10(sum_sat/sum_noise)*/
```

A method in accordance with an exemplary embodiment of the present invention is depicted in FIG. 3. A signal is received by a base station at block 302. A SAT signal is extracted from the received signal at block 304. The extracted SAT signal is mixed with a signal (i.e., cosωt) to extract a real component of the SAT signal (at block 306). Low pass filtered at block 308 in order to limit the bandwidth of the signal. The variance of the filter output is calculated at block 310, which variance is an indication of channel noise. The variance can be compared to a strength measurement of the SAT signal, at block 312, to determine a signal-to-noise ratio of the SAT signal.

The SAT signal is continuously present during voice transmission. Hence it is a very convenient signal to use for the purpose of determining a signal-to-noise ratio of a voice channel. This is especially true in view of the possible availability of the SAT signal strength measurement performed within block 202 in accordance with U.S. application Ser. No. 08/561,055 cited above and incorporated by reference. It will be appreciated that any other known signal type can be extracted from the received signal and then have its information portion, such as the specific SAT, removed in order to extract a difference, or remainder, which can be used to determine a noise component. For example, any known, or expected signal above the frequency band associated with the transmitted speech can be extracted from a received signal. The anticipated value can be subtracted from the extracted signal to produce a difference value whose variance is indicative of noise in the signal.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for measuring a noise component of a received and demodulated signal using a digital signal processor, the method comprising the steps of:

performing a digital Fourier transform on the received and demodulated signal which includes extracting real and imaginary components of a supervisory audio tone signal;

filtering the real components to provide a filtered output;

calculating a sum of a square of the filtered output to provide a first value;

calculating a square of a sum of the filtered output to provide a second value; and subtracting the second value from the first value to provide a variance, which variance is indicative of the noise component of the supervisory audio tone signal.

2. The method of claim 1, further comprising the step of:

comparing the noise component to a signal strength to determine a signal to noise ratio.

3. The method of claim 1, wherein the step of filtering the real components comprises the step of:

passing the real components through a low pass filter.

4. The method of claim 3, wherein said low pass filter also downsamples said real components.

5. A base station comprising:

means for receiving a SAT signal; and a digital signal processor (DSP) for measuring a noise component of the SAT signal, wherein said DSP performs a digital fourier transform on the SAT signal;

wherein the DSP operates on a real component of the SAT signal using a variance calculation to provide a measurement of the noise component of the SAT signal.

6. A method for determining a noise component of a signal, the method comprising the steps of:

sampling the signal;

extracting a real component from the sample;

filtering the real component to extract a low frequency portion; and calculating a variance of the low frequency portion to determine a noise component of the signal.

7. A base station comprising:

an input node for receiving a sample stream of a received signal;

a mixer for mixing said sample stream of said received signal with a sinusoidal signals at a SAT frequency to extract real and imaginary sample components;

means for detecting a signal strength of a SAT using said real and imaginary sample components; and means for detecting noise in said SAT using said real sample components, wherein the means for detecting noise includes means for performing a variance calculation using the real sample components.

8. The base station of claim 7, wherein said SAT frequency is one of 5970, 6000 and 6030 Hz.

9. The base station of claim 7, wherein said means for detecting a signal strength and said means for detecting noise are a digital signal processor (DSP) implementing software routines that each use said extracted real sample components to reduce a number of MIPs needed to implement SAT detection and noise measurement in said DSP.

10. A base station comprising:

an input node for receiving a sample stream of a received signal;

a mixer for mixing the sample stream of the received signal with a first and a second signal at an expected SAT frequency to extract real and imaginary sample components;

means for determining a signal strength of an expected SAT signal using the real and imaginary sample components; and means for determining noise in the expected SAT signal using the real sample components, wherein the means for determining noise includes a variance calculation for determining the noise in the expected SAT signal.

11. The base station of claim 10, wherein the expected SAT frequency is one of 5970, 6000 and 6030 Hz.

* * * * *